United States Patent
Wu et al.

(10) Patent No.: US 9,529,468 B2
(45) Date of Patent: Dec. 27, 2016

(54) TOUCH DRIVING CIRCUIT, LIQUID CRYSTAL PANEL AND ITS DRIVING METHOD

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventors: Bo Wu, Beijing (CN); Xiaojing Qi, Beijing (CN); Wen Tan, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 130 days.

(21) Appl. No.: 14/429,525

(22) PCT Filed: Oct. 9, 2013

(86) PCT No.: PCT/CN2013/084921
§ 371 (c)(1),
(2) Date: Mar. 19, 2015

(87) PCT Pub. No.: WO2014/205951
PCT Pub. Date: Dec. 31, 2014

(65) Prior Publication Data
US 2015/0227247 A1    Aug. 13, 2015

(30) Foreign Application Priority Data

Jun. 26, 2013    (CN) .......................... 2013 1 0259735

(51) Int. Cl.
*G06F 3/041*    (2006.01)
*G02F 1/1333*    (2006.01)
(Continued)

(52) U.S. Cl.
CPC ........... *G06F 3/0412* (2013.01); *G02F 1/1333* (2013.01); *G06F 3/042* (2013.01); *G06F 3/0421* (2013.01);
(Continued)

(58) Field of Classification Search
None
See application file for complete search history.

(56) References Cited

U.S. PATENT DOCUMENTS 8,183,518 B2 *  5/2012  Ahn .................. G06F 3/042
                                                           250/221
8,334,853 B2    12/2012  Kim et al.
(Continued)

FOREIGN PATENT DOCUMENTS

CN       1758197 A       4/2006
CN       101510132 A     8/2009
(Continued)

OTHER PUBLICATIONS

International Search Report for PCT/CN2013/084921, ISA/CN, Beijing, mailed Apr. 3, 2014.
(Continued)

*Primary Examiner* — Antonio Xavier
(74) *Attorney, Agent, or Firm* — Harness, Dickey & Pierce, P.L.C.

(57) ABSTRACT

The present disclosure provides a touch driving circuit, a liquid crystal panel and its driving method, so as to prevent the occurrence of an error due to non-uniform parameters of elements in the touch driving circuit, thereby to improve the reliability of a touch screen panel. The touch driving circuit includes a photoelectricity generation unit, an amplification unit, an output control unit and an amplification control unit.

20 Claims, 4 Drawing Sheets

(51) Int. Cl.
*G06F 3/042* (2006.01)
*G09G 3/36* (2006.01)
*G02F 1/133* (2006.01)

(52) U.S. Cl.
CPC ... *G09G 3/3648* (2013.01); *G02F 2001/13312* (2013.01); *G09G 2300/0404* (2013.01); *G09G 2300/08* (2013.01)

(56) References Cited

U.S. PATENT DOCUMENTS

| | | | |
|---|---|---|---|
| 8,451,233 B2 | 5/2013 | Chuang | |
| 8,451,251 B2* | 5/2013 | Choi | G06F 3/042 178/18.09 |
| 9,123,613 B2* | 9/2015 | Brown | G06F 3/0412 |
| 9,285,938 B2* | 3/2016 | Zhou | G06F 3/0412 |
| 2006/0033016 A1 | 2/2006 | Ogawa et al. | |
| 2006/0033729 A1* | 2/2006 | Yoshida | G06F 3/042 345/207 |
| 2009/0200088 A1 | 8/2009 | Chuang | |
| 2010/0012823 A1* | 1/2010 | Ahn | G06F 3/042 250/214 R |
| 2010/0231562 A1* | 9/2010 | Brown | G06F 3/0412 345/207 |
| 2011/0001711 A1* | 1/2011 | Choi | G06F 3/042 345/173 |
| 2011/0050600 A1 | 3/2011 | Kim et al. | |
| 2012/0056252 A1 | 3/2012 | Aoki et al. | |
| 2012/0091321 A1* | 4/2012 | Tanaka | G06F 3/0412 250/208.2 |
| 2012/0206411 A1 | 8/2012 | Park et al. | |
| 2015/0302801 A1* | 10/2015 | Tan | G06F 3/042 345/173 |

FOREIGN PATENT DOCUMENTS

| | | |
|---|---|---|
| CN | 101587400 A | 11/2009 |
| CN | 101900904 A | 12/2010 |
| CN | 101943974 A | 1/2011 |
| CN | 102004581 A | 4/2011 |
| CN | 203300198 U | 11/2013 |
| JP | 5014439 B2 | 8/2012 |

OTHER PUBLICATIONS

Chinese Office Action mailed Nov. 2, 2014 regarding Chinese Application No. 201310259735.1. Translation provided by Dragon Intellectual Property Law Firm.

* cited by examiner

TOUCH DRIVING CIRCUIT, LIQUID CRYSTAL PANEL AND ITS DRIVING METHOD

CROSS-REFERENCE TO RELATED APPLICATION

This application is the U.S. national phase of PCT Application No. PCT/CN2013/084921 filed on Oct. 9, 2013, which claims a priority of the Chinese Patent Application No. 201310259735.1 filed on Jun. 26, 2013, the disclosures of which are incorporated in their entirety by reference herein.

TECHNICAL FIELD

The present disclosure relates to the field of liquid crystal display technology, in particular to a touch driving circuit, a liquid crystal panel and its driving method.

BACKGROUND

A TSP in Cell technique, i.e., a technique in which a touch screen panel (TSP) is integrated in a liquid crystal cell, refers to manufacturing a sensor of the TSP and its driving circuit on an array substrate using an array process. By integrating the TSP sensor in a cell of a liquid crystal display (LCD) panel (LCD Panel Cell), it is able to provide a light and thin product with diversified functions, and to effectively improve the reliability of the TSP.

Figure 1:
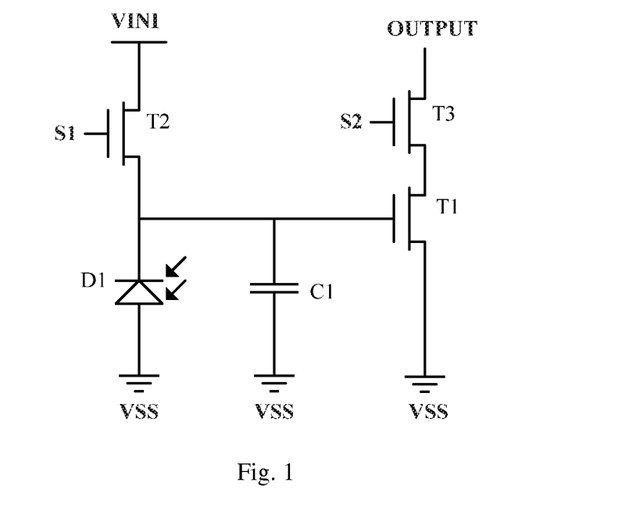
FIG. 1 is a schematic view showing an existing basic light-induced touch driving circuit.

Referring to FIG. 1, which shows an existing basic light-induced touch driving circuit, the sensor senses light using a photodiode D1 and generates a leakage current so as to detect a touch signal. A thin-film transistor (TFT) T1 serves as an amplification transistor so as to enhance outputting and driving capabilities of the touch driving circuit, thereby to enable a TSP external reading circuit to read a detection result accurately. This circuit is present in each pixel in the cell, wherein VINI represents an initial level, and OUTPUT represents a data reading line. Each row of pixels in the cell is provided with an initial signal line so as to drive the respective touch driving circuits through VINI, and each column of pixels is provided with a data reading line so as to read the touch signal through OUTPUT.

For an existing process, a circuit of the panel is manufactured using a low temperature poly-silicon (LTPS) technique. However, elements manufactured by this process are of non-uniform parameters, resulting in non-uniform level gains for the amplification transistors of the respective touch driving circuits as well as different touch signals amplified and outputted by the amplification transistors when the same touch is made. As a result, an error will occur when the touch signal is read.

SUMMARY

An object of the present disclosure is to provide a touch driving circuit, a liquid crystal panel and its driving method, so as to prevent the occurrence of an error when a touch signal is read, thereby to improve the reliability of a touch screen panel.

In one aspect, the present disclosure provides a touch driving circuit, including a photoelectricity generation unit, an amplification unit, an output control unit and an amplification control unit. The photoelectricity generation unit is connected between an initial signal line and the amplification control unit. The amplification control unit is connected between a gate scanning signal line for current-row pixels and a gate scanning signal line for previous-row pixels, and connected to the photoelectricity generation unit, the amplification unit and the output control unit. The amplification control unit is configured to, when a gate scanning signal for the current-row pixels is at a first level and a gate scanning signal for the previous-row pixels is at a second level, receive a level of the initial signal line by the photoelectricity generation unit, wherein the initial signal line inputs the first level and then an initial level, so that a level at a connection point between the amplification control unit and the amplification unit is a sum of the initial level and an on-state voltage of the amplification unit. The amplification control unit is further configured to, when the gate scanning signal for the current-row pixels is at the second level, the gate scanning signal for the previous-row pixels is at the second level and the initial signal line inputs the initial level, decrease the level at the connection point between the amplification control unit and the amplification unit if a touch is not sensed by the photoelectricity generation unit. The amplification unit is connected between the initial signal line and the output control unit, and connected to the amplification control unit via the connection point. The amplification unit is configured to output a current to the output control unit in accordance with the level at the connection point. The output control unit is connected between a data output line and the amplification unit, and connected to the gate scanning signal line for the previous-row pixels. The output control unit is configured to, when the gate scanning signal for the current-row pixels is at the second level, the gate scanning signal for the previous-row pixels is at the first level and the initial signal line inputs the initial level, output the current outputted from the amplification unit to the data output line. A value of the initial level is in a range between the first level and the second level.

In another aspect, the present disclosure provides a liquid crystal panel, including a pixel unit and the above-mentioned touch driving circuit.

In yet another aspect, the present disclosure provides a method for driving the liquid crystal panel, including steps of:

inputting a first level by a gate scanning signal line for current-row pixels, inputting a second level by a gate scanning signal line for previous-row pixels, and inputting the first level and then an initial level by an initial signal line, so that a level at a connection point between an amplification control unit and an amplification unit is a sum of the initial level and an on-state voltage of the amplification unit;

inputting the second level by the gate scanning signal line for the current-row pixels, inputting the second level by the gate scanning signal line for the previous-row pixels, inputting the initial level by the initial signal line, and if a touch is not sensed by a photoelectricity generation unit, decreasing the level at the connection point between the amplification control unit and the amplification unit; and inputting the second level by the gate scanning signal line for the current-row pixels, inputting the first level by the gate scanning signal line for the previous-row pixels, inputting the initial level by the initial signal line, and outputting, by an output control unit, a current outputted from the amplification unit in accordance with the level at the connection point between the amplification control unit and the amplification unit to a data output line, wherein a value of the initial level is in a range between the first level and the second level.

According to the present disclosure, the level at the connection point between the amplification control unit and the amplification unit is changed to a sum of the initial level and the on-state voltage of the amplification unit. Therefore, the current outputted from the amplification unit to the output control unit is a function irrelevant to the on-state voltage of the amplification unit, and the current read by the data output line will not change with different parameters of elements, so it is able to accurately determine whether or not the touch is sensed by the photoelectricity generation unit in accordance with the current read by the data output line. As a result, it is able to prevent the occurrence of an error when a touch signal is read, thereby to improve the reliability of the touch screen panel.

DETAILED DESCRIPTION

The present disclosure provides a touch driving circuit, a liquid crystal panel and its driving method, so as to prevent the occurrence of an error due to non-uniform parameters of elements when a touch signal is read, thereby to improve the reliability of a touch screen panel.

Figure 2:
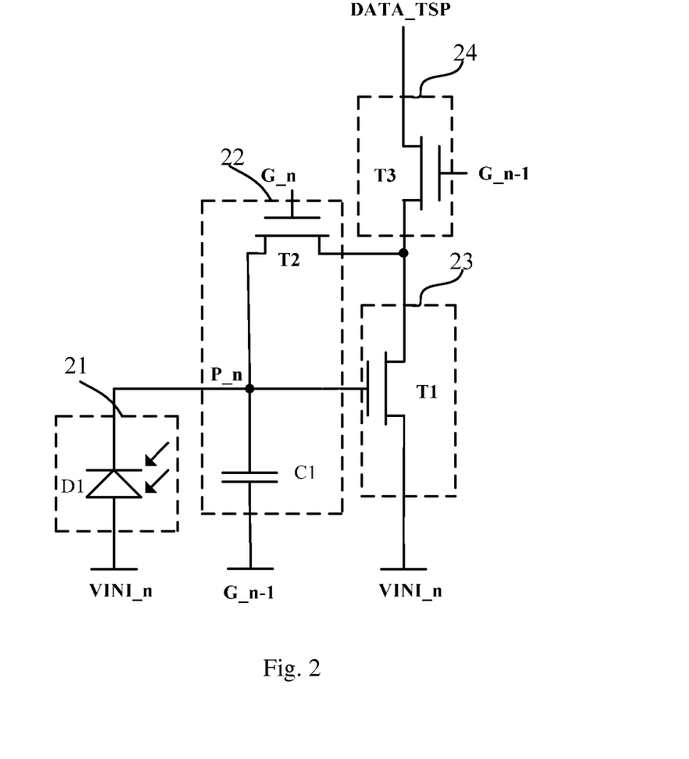
FIG. 2 is a schematic view showing a touch driving circuit according to an embodiment of the present disclosure.

Referring to FIG. 2, the touch driving circuit of the present disclosure includes a photoelectricity generation unit 21, an amplification control unit 22, an amplification unit 23 and an output control unit 24.

The photoelectricity generation unit 21 is connected between an initial signal line VINI and the amplification control unit 22. The amplification control unit 22 is connected between a gate scanning signal line G_n for current-row pixels and a gate scanning signal line G_n−1 for previous-row pixels, connected to the photoelectricity generation unit 21 and the amplification unit 23 at a connection point P_n, and connected to the output control unit 24. The amplification control unit 22 is configured to, when the gate scanning signal G_n for the current-row pixels is at a first level and the gate scanning signal G_n−1 for the previous-row pixels is at a second level, receive a level of the initial signal line VINI_n by the photoelectricity generation unit 21, wherein the initial signal line VINI_n inputs the first level and then an initial level VINI, so that a level at the connection point P_n between the amplification control unit 22 and the amplification unit 23 is a sum of the initial level and an on-state voltage of the amplification unit. The amplification control unit 22 is further configured to, when the gate scanning signal G_n for the current-row pixels is at the second level, the gate scanning signal G_n−1 for the previous-row pixels is at the second level and the initial signal line VINI_n inputs the initial level VINI, decrease the level at the connection point P_n between the amplification control unit and the amplification unit if a touch is not sensed by the photoelectricity generation unit. The amplification unit 23 is connected between the initial signal line VINI_n and the output control unit 24, and connected to the amplification control unit 22 via the connection point P_n. The amplification unit 23 is configured to output a current to the output control unit 24 in accordance with the level at the connection point P_n.

The output control unit 24 is connected between a data output line DATA_TSP and the amplification unit 23, and connected to the gate scanning signal line G_n−1 for the previous-row pixels. The output control unit 24 is configured to, when the gate scanning signal G_n for the current-row pixels is at the second level, the gate scanning signal G_n−1 for the previous-row pixels is at the first level and the initial signal line VINI_n inputs the initial level VINI, output the current outputted from the amplification unit to the data output line DATA_TSP.

A value of the initial level is in a range between the first level and the second level.

Alternatively, the photoelectricity generation unit 21 includes a photodiode D1, two electrodes of which are connected to the initial signal line VINI_n and the connection point P_n between the amplification control unit and the amplification unit, respectively. D1 can generate a reverse leakage current when light is irradiated on it (i.e., no touch is sensed). At this time, because the light is received by D1, a large light-induced current will be generated. In contrast, when no light is irradiated on D1 (i.e., a touch is sensed), the light from an external light source cannot be irradiated on D1, so a small light-induced current will be generated.

Alternatively, the amplification unit 23 includes a first transistor T1, a gate electrode of which is connected to the connection point P_n between the amplification control unit and the amplification unit, and the other two electrodes of which are connected to the initial signal line VINI_n and the output control unit 24, respectively. The on-state voltage of the amplification unit is a threshold voltage $V_{th\_T1}$ of the first transistor T1.

Alternatively, the amplification control unit 22 includes a second transistor T2 and a capacitor C1. A gate electrode of the second transistor T2 is connected to the gate scanning signal line G_n for the current-row pixels, and the other two electrodes thereof are connected to the connection point P_n between the amplification control unit and the amplification unit, and the output control unit 24, respectively. Two ends of the capacitor C1 are connected to the connection point P_n between the amplification control unit and the amplification unit, and the gate scanning signal line G_n−1 for the previous-row pixels, respectively.

Alternatively, the output control unit 24 includes a third transistor T3, a gate electrode of which is connected to the gate scanning signal line G_n−1 for the previous-row pixels, and the other two electrodes of which are connected to the data output line DATA_TSP and the amplification unit 23, respectively.

Figure 3:
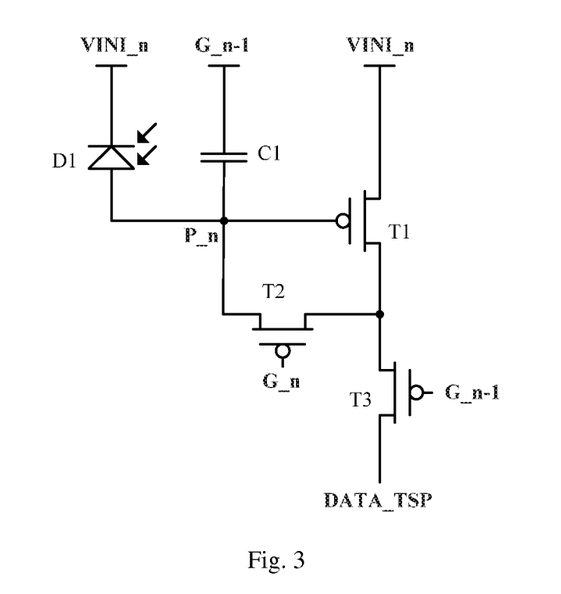
FIG. 3 is a schematic view showing another touch driving circuit according to an embodiment of the present disclosure.

In FIG. 2, T1, T2 and T3 are all N-type transistors, an anode of D1 is connected to the initial signal line VINI_n, and a cathode thereof is connected to P_n. In another embodiment as shown in FIG. 3, T1, T2 and T3 are all P-type transistors, the cathode of D1 is connected to VINI_n, and the anode thereof is connected to P_n.

Alternatively, the transistor is a thin film transistor (TFT).

Alternatively, the first level is an on-state level of the transistor, and the second level is an off-state level of the transistor.

The present disclosure further provides a liquid crystal panel, including a pixel unit and the above-mentioned touch driving circuit.

Figure 4:
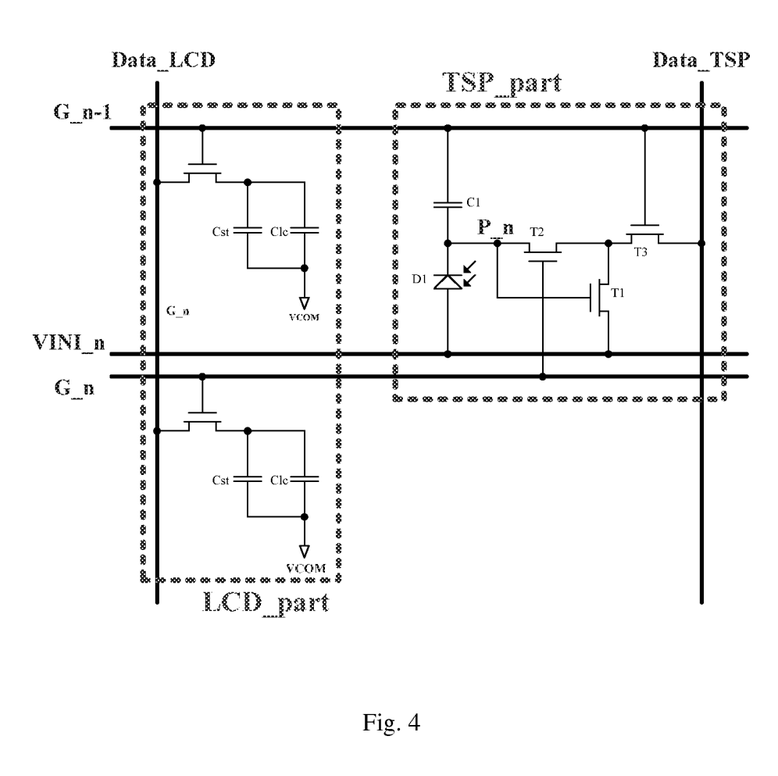
FIG. 4 is a circuit diagram of a pixel unit integrated with the touch driving circuit according to an embodiment of the present disclosure.

FIG. 4 is a circuit diagram of the liquid crystal panel according to an embodiment of the present disclosure, where TSP_Part represents a touch driving circuit part, LCD_Part represents an existing pixel unit, and DATA_LCD represents a data line for the existing pixel unit. The touch driving circuit part TSP_Part may use the touch driving circuit including the N-type transistors as shown in FIG. 2, or that including the P-type transistors as shown in FIG. 3.

Figure 5:
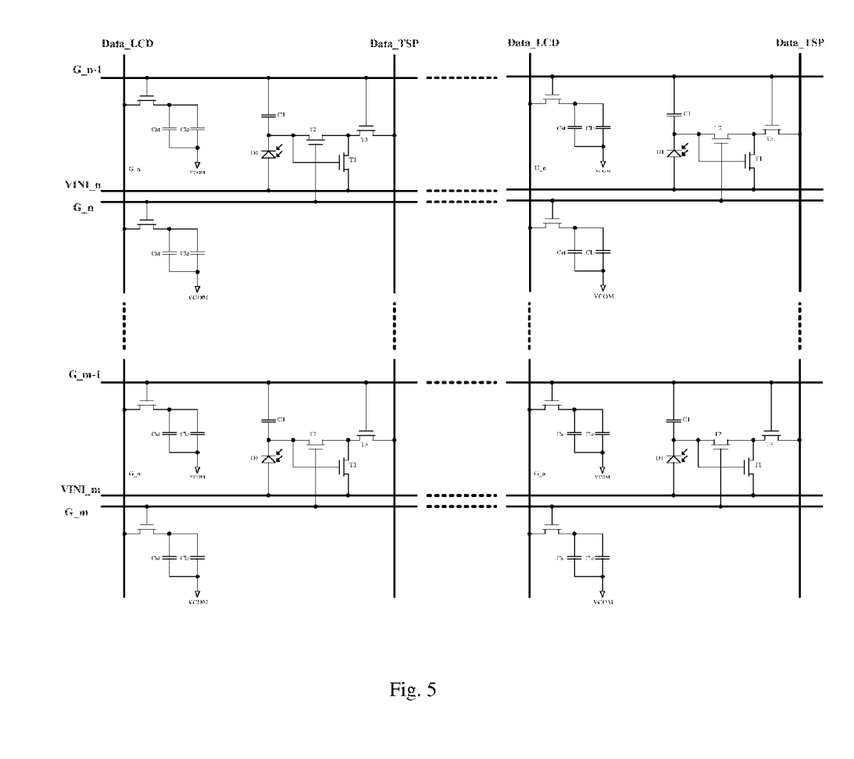
FIG. 5 is a schematic view showing a display unit array according to an embodiment of the present disclosure.

FIG. 5 is a schematic view showing a display unit array of the liquid crystal panel according to an embodiment of the present disclosure, where the touch driving circuit part may use the touch driving circuit including the N-type transistors as shown in FIG. 2, or that including the P-type transistors as shown in FIG. 3.

The procedure of the touch driving circuit during the operation will be described hereinafter in conjunction with FIGS. 2 and 6.

Figure 6:
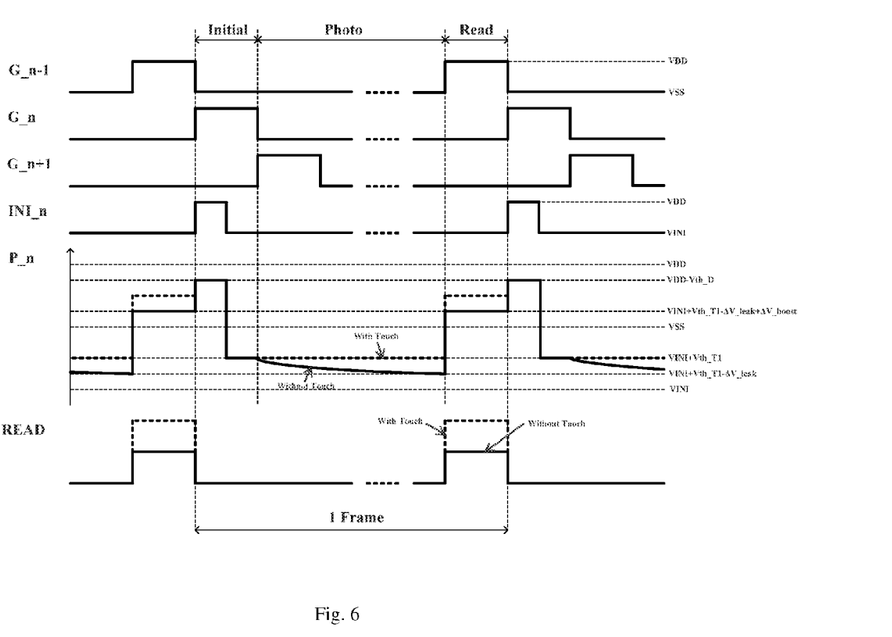
FIG. 6 is a driving sequence diagram according to an embodiment of the present disclosure.

As shown in FIG. 6, a horizontal direction represents changes in respective input/output signals with the elapse of time, a vertical direction represents values of the signals, G_n represents the gate scanning signal for the current-row pixels, G_n−1 represents the gate scanning signal for the previous-row pixels, G_n+1 represents the gate scanning signal for next-row pixels, VINI_n represents the initial signal, P_n represents the level at the connection point P_n in FIG. 2, READ represents a current outputted from the touch driving circuit to the data output line, wherein a broken line represents a high level outputted when the touch screen panel is touched, and a solid line represents a low level outputted when the touch screen panel is not touched.

In the following, alternatively, the first level is an on-state level of the transistor and the second level is an off-state level of the transistor.

Figure 7:
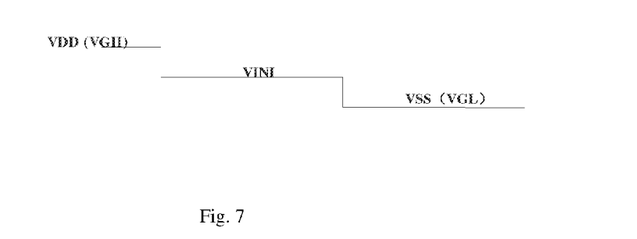
FIG. 7 is a schematic view showing a relationship among levels according to an embodiment of the present disclosure.

FIG. 6 is a driving sequence diagram of the liquid crystal panel when the N-type transistors are used. VDD represents the first level (high level), i.e., the on-state level of the gate scanning signal, VSS represents the second level (low level), i.e., the off-state level of the transistor, and VDD and VINI represent a high level and a low level of the initial signal, respectively. The initial level VINI is in a range between the first level and the second level, i.e., VDD>VINI>VSS, as shown in FIG. 7. When the P-type transistors are used, in the driving sequence for the touch driving circuit, the initial level is of a value greater than the first level and less than the second level, wherein the first level is the low level VSS and the second level is the high level VDD.

Referring again to FIG. 6, the levels at the connection point P_n are varied among several values, where Vth_D represents a threshold voltage of the photodiode D1, Vth_T1 represents a threshold voltage of the first transistor T1, ΔV_leak represents a level variation Δ at P_n after the current leakage through the photodiode D1, and ΔV_boost represents a difference between the first level and the second level of the transistor. The parameters in FIG. 6 not mentioned herein are the same as those mentioned hereinbefore.

Here, the touch driving circuit including the N-type transistors in FIG. 6 will be taken as an example. Within each frame, the procedure of the touch driving circuit includes three stages, i.e., an Initial stage, a Photo state, and a Read stage. The driving procedure will be described as follows.

At the Initial stage, the gate scanning signal line for the current-row pixels inputs the first level, the gate scanning signal line for the previous-row pixels inputs the second level, and the initial signal line input the first level and then the initial level, so that the level at the connection point between the amplification control unit and the amplification unit is a sum of the initial level and the on-state voltage of the amplification unit.

At the Photo stage, the gate scanning signal line for the current-row pixels inputs the second level, the gate scanning signal line for the previous-row pixels inputs the second level, and the initial signal line inputs the initial level. If no touch is sensed by the photoelectricity generation unit, a large light-induced current will be generated, so as to decrease the level at the connection point P_n between the amplification control unit and the amplification unit. In contrast, if the photoelectricity generation unit is touched, a small light-induced current will be generated, so as to maintain the level at the connection point P_n as unchanged. As shown in FIG. 6, at this stage, the broken line indicated by VINI+$V_{th\_T1}$ means that the level at the connection point P_n is maintained as unchanged when the touch screen panel is touched, and the descending solid line means that the level at the connection point P_n decreases gradually when the touch screen panel is not touched.

At the Read stage, the gate scanning signal line for the current-row pixels inputs the second level, the gate scanning signal line for the previous-row pixels inputs the first level, and the initial signal line inputs the initial level. At this time, the output control unit outputs the current, which is outputted by the amplification unit in accordance with the level at the connection point, to the data output line. An operating principle of the touch driving circuit will be further described hereinafter in conjunction with expressions and the driving sequence in FIG. 6.

At the Initial stage, G_n inputs VDD, G_n−1 inputs VSS, T2 is turned on, and T3 is turned off. At first, C1 is charged by D1 using VINI_n, and the level at P_n is VDD-Vth_D (a threshold voltage of D1). Then, the level of VINI_n is jumped to VINI. The gate and drain electrodes of T1 are both VINI, and a short circuit is formed, so T1 is equivalent to a diode. At this time, C1 is discharged toward VINI_n through T1, until the level at P_n reaches VINI+$V_{th\_T1}$ (a threshold voltage of the amplification transistor T1). The initial stage aims to change the level at the connection point P_n between the amplification control unit and the amplification unit to a sum of the initial level and the threshold voltage of the transistor T1, i.e., VINI+$V_{th\_T1}$.

At the Photo stage which takes a majority part of one frame, G_n and G_n−1 input VSS, T2 and T3 are turned off, and a touch state of the panel is detected by D1. When a region of the panel corresponding to D1 is touched by a finger (With Touch), the light from the external light source will not be irradiated on D1, and less light will be received by D1, so a small light-induced leakage current will occur, and the level at P_n will almost not be changed but maintained at VINI+$V_{th\_T1}$. When the panel is not touched by the finger (Without Touch), the light from the external light source will be irradiated on D1, and more light will be received by D1, so a large light-induced leakage current will occur. Presumed that a level variation of P_n after the current leakage through D1 is $\Delta V_{LEAK}$, when the panel is not touched, the level at the connection point P_n will be changed to VINI+$V_{th\_T1}$−$\Delta V_{LEAK}$ after the current leakage through D1.

At the Read stage, the amplification transistor T1 is biased to be in a saturation/amplification region with the biggest gain, and a peripheral read circuit reads a detection result when G_n−1 inputs VDD. G_n−1 inputs VDD, G_n inputs VSS, T2 is turned off, and T3 is turned on. T1 operates in the saturation/amplification region, and the current amplified by T1 is outputted to DATA_TSP. At the beginning of this stage, G_n–1 is jumped from VSS to VDD, i.e., $\Delta V_{BOOST}$=VDD–VSS, so a level at the gate electrode of the amplification transistor T1 at the Read stage, i.e., the level at P_n, is $VINI+V_{th\_T1}-\Delta V_{LEAK}+\Delta V_{BOOST}$. Based on the relationship between the level at the gate electrode of the transistor at the saturation/amplification region and the output current, an amplified current IDS_T1 outputted from T1 to T3 may be calculated as follows:

$$I_{DS\_T1} = \frac{1}{2} \cdot K \cdot [VINI + V_{th\_T1} - \Delta V_{LEAK} + \Delta V_{BOOST} - V_{th\_T1}]^2$$
$$= \frac{1}{2} \cdot K \cdot (VINI - \Delta V_{LEAK} + \Delta V_{BOOST})^2,$$

wherein K represents a constant.

Because the level at P_n is pre-adjusted at the Initial stage, the influence of Vth_T1 will be eliminated according to the above expression for calculating the current amplified and outputted by the transistor T1. As a result, it is able to prevent DATA_TSP from reading different currents when the same touch is made, thereby to improve the reliability of the amplified signal.

In a word, according to the touch driving circuit, the liquid crystal panel and its driving method of the present disclosure, it is able to prevent the occurrence of an error due to non-uniform parameters of elements when the touch signal is read, thereby to improve the reliability of the touch screen panel.

Obviously, a person skilled in the art may make further modifications and variations without departing from the spirit and scope of the present disclosure, and if these modifications and variations fall within the scope of the appended claims and the equivalents thereof, the present disclosure also intends to include them.

What is claimed is:

1. A touch driving circuit, comprising a photoelectricity generation unit, an amplification unit, an output control unit and an amplification control unit, wherein
the photoelectricity generation unit is connected between an initial signal line and the amplification control unit,
the amplification control unit is connected between a gate scanning signal line for current-row pixels and a gate scanning signal line for previous-row pixels, and connected to the photoelectricity generation unit, the amplification unit and the output control unit, wherein the amplification control unit is configured to, when a gate scanning signal for the current-row pixels is at a first level and a gate scanning signal for the previous-row pixels is at a second level, receive a level of the initial signal line by the photoelectricity generation unit, wherein the initial signal line inputs the first level and then an initial level, so that a level at a connection point between the amplification control unit and the amplification unit is a sum of the initial level and an on-state voltage of the amplification unit, and wherein the amplification control unit is further configured to, when the gate scanning signal for the current-row pixels is at the second level, the gate scanning signal for the previous-row pixels is at the second level and the initial signal line inputs the initial level, decrease the level at the connection point between the amplification control unit and the amplification unit when a touch is not sensed by the photoelectricity generation unit,
the amplification unit is connected between the initial signal line and the output control unit, and connected to the amplification control unit via the connection point, and the amplification unit is configured to output a current to the output control unit in accordance with the level at the connection point,
the output control unit is connected between a data output line and the amplification unit, and connected to the gate scanning signal line for the previous-row pixels, and the output control unit is configured to, when the gate scanning signal for the current-row pixels is at the second level, the gate scanning signal for the previous-row pixels is at the first level and the initial signal line inputs the initial level, output the current outputted from the amplification unit to the data output line, and
a value of the initial level is in a range between the first level and the second level.

2. The touch driving circuit according to claim 1, wherein the photoelectricity generation unit comprises a photodiode, two electrodes of which are connected to the initial signal line and the connection point between the amplification control unit and the amplification unit, respectively.

3. The touch driving circuit according to claim 2, wherein the first level is an on-state level of the transistor, and the second level is an off-state level of the transistor.

4. The touch driving circuit according to claim 1, wherein the amplification unit comprises a first transistor, a gate electrode of which is connected to the connection point between the amplification control unit and the amplification unit, and the other two electrodes of which are connected to the initial signal line and the output control unit, respectively.

5. The touch driving circuit according to claim 4, wherein the first level is an on-state level of the transistor, and the second level is an off-state level of the transistor.

6. The touch driving circuit according to claim 1, wherein the amplification control unit comprises a second transistor and a capacitor,
wherein a gate electrode of the second transistor is connected to the gate scanning signal line for the current-row pixels, and the other two electrodes of the second transistor are connected to the connection point between the amplification control unit and the amplification unit, and the output control unit, respectively, and
two ends of the capacitor are connected to the connection point between the amplification control unit and the amplification unit, and the gate scanning signal line for the previous-row pixels, respectively.

7. The touch driving circuit according to claim 6, wherein the first level is an on-state level of the transistor, and the second level is an off-state level of the transistor.

8. The touch driving circuit according to claim 1, wherein the output control unit comprises a third transistor, a gate electrode of which is connected to the gate scanning signal line for the previous-row pixels, and the other two electrodes of which are connected to the data output line and the amplification unit, respectively.

9. The touch driving circuit according to claim 8, wherein the first level is an on-state level of the transistor, and the second level is an off-state level of the transistor.

10. A liquid crystal panel, comprising a pixel unit and the touch driving circuit according to claim 1.

11. A method for driving the liquid crystal panel according to claim 10, comprising steps of:
inputting a first level by a gate scanning signal line for current-row pixels, inputting a second level by a gate scanning signal line for previous-row pixels, and inputting the first level and then an initial level by an initial signal line, so that a level at a connection point between an amplification control unit and an amplification unit is a sum of the initial level and an on-state voltage of the amplification unit;

inputting the second level by the gate scanning signal line for the current-row pixels, inputting the second level by the gate scanning signal line for the previous-row pixels, inputting the initial level by the initial signal line, and when a touch is not sensed by a photoelectricity generation unit, decreasing the level at the connection point between the amplification control unit and the amplification unit; and inputting the second level by the gate scanning signal line for the current-row pixels, inputting the first level by the gate scanning signal line for the previous-row pixels, inputting the initial level by the initial signal line, and outputting, by an output control unit, a current outputted from the amplification unit in accordance with the level at the connection point to a data output line, wherein a value of the initial level is in a range between the first level and the second level.

12. The method according to claim 11, wherein the first level is an on-state level of a transistor, and the second level is an off-state level of a transistor.

13. The liquid crystal panel according to claim 10, wherein the photoelectricity generation unit comprises a photodiode, two electrodes of which are connected to the initial signal line and the connection point between the amplification control unit and the amplification unit, respectively.

14. The touch driving circuit according to claim 13, wherein the first level is an on-state level of the transistor, and the second level is an off-state level of the transistor.

15. The touch driving circuit according to claim 10, wherein the amplification unit comprises a first transistor, a gate electrode of which is connected to the connection point between the amplification control unit and the amplification unit, and the other two electrodes of which are connected to the initial signal line and the output control unit, respectively.

16. The touch driving circuit according to claim 15, wherein the first level is an on-state level of the transistor, and the second level is an off-state level of the transistor.

17. The touch driving circuit according to claim 10, wherein the amplification control unit comprises a second transistor and a capacitor, wherein a gate electrode of the second transistor is connected to the gate scanning signal line for the current-row pixels, and the other two electrodes of the second transistor are connected to the connection point between the amplification control unit and the amplification unit, and the output control unit, respectively, and two ends of the capacitor are connected to the connection point between the amplification control unit and the amplification unit, and the gate scanning signal line for the previous-row pixels, respectively.

18. The touch driving circuit according to claim 17, wherein the first level is an on-state level of the transistor, and the second level is an off-state level of the transistor.

19. The touch driving circuit according to claim 10, wherein the output control unit comprises a third transistor, a gate electrode of which is connected to the gate scanning signal line for the previous-row pixels, and the other two electrodes of which are connected to the data output line and the amplification unit, respectively.

20. The touch driving circuit according to claim 19, wherein the first level is an on-state level of the transistor, and the second level is an off-state level of the transistor.

* * * * *